(12) United States Patent
Rothschild

(10) Patent No.: US 12,488,077 B1
(45) Date of Patent: Dec. 2, 2025

(54) METHOD AND A SYSTEM FOR PROVIDING AN ENCRYPTED FILE TO AN AUTHORIZED ENTITY

(71) Applicant: Leigh M. Rothschild, Miami, FL (US)

(72) Inventor: Leigh M. Rothschild, Miami, FL (US)

(*) Notice: Subject to any disclaimer, the term of this patent is extended or adjusted under 35 U.S.C. 154(b) by 0 days.

(21) Appl. No.: 18/750,725

(22) Filed: Jun. 21, 2024

(51) Int. Cl.
| | |
|---|---|
| *G06F 21/62* | (2013.01) |
| *G06F 21/32* | (2013.01) |
| *G06F 21/60* | (2013.01) |
| *H04L 29/06* | (2006.01) |
| *G06Q 30/0645* | (2023.01) |

(52) U.S. Cl.
CPC ............ *G06F 21/32* (2013.01); *G06F 21/602* (2013.01); *G06F 21/6245* (2013.01); *G06Q 30/0645* (2013.01)

(58) Field of Classification Search
CPC ..... G06F 21/6245; G06F 21/32; G06F 21/602
USPC ......................................................... 726/27
See application file for complete search history.

(56) References Cited

U.S. PATENT DOCUMENTS

| | | | |
|---|---|---|---|
| 8,031,084 B2 | 10/2011 | Rothschild | |
| 8,155,887 B2 | 4/2012 | Rothschild | |
| 8,307,089 B1 | 11/2012 | Rothschild | |
| 8,424,752 B2 | 4/2013 | Rothschild | |
| 8,469,270 B1 | 6/2013 | Rothschild | |
| 8,606,503 B2 | 12/2013 | Rothschild | |
| 8,651,369 B2 | 2/2014 | Rothschild | |
| 8,798,544 B2 | 8/2014 | Rothschild | |
| 8,798,640 B2 | 8/2014 | Rothschild | |
| 10,979,679 B1* | 4/2021 | Williams | H04N 7/188 |
| 11,113,415 B1* | 9/2021 | Amico | H04W 12/02 |
| 11,926,321 B1 | 3/2024 | Rothschild | |
| 2019/0058728 A1* | 2/2019 | Datta | H04L 67/12 |

(Continued)

FOREIGN PATENT DOCUMENTS

| | | | |
|---|---|---|---|
| CN | 105448101 A1 | | 12/2015 |
| CN | 115170214 A | * | 10/2022 |
| CN | 218004144 U | * | 12/2022 |

(Continued)

*Primary Examiner* — Haresh N Patel
(74) *Attorney, Agent, or Firm* — Dobbin IP Law, P.C.; Geoffrey E. Dobbin

(57) ABSTRACT

The disclosure for a method for providing information. The traditional methods of managing information within vehicles, such as physical document storage and manual verification processes, are plagued by security vulnerabilities, limited accessibility, and organizational challenges. Stand-alone digital storage devices and cloud-based solutions offer alternatives but come with their own set of concerns, including security risks and dependence on internet connectivity. To address these shortcomings, the present disclosure proposes a comprehensive solution for securely managing and accessing information within the vehicle environment. By leveraging electronic devices within vehicles, encryption techniques, user authentication methods, and dynamic document management, the present disclosure ensures both security and convenience. This integrated approach enhances user experience, facilitates emergency response, and minimizes the risk of document loss or damage. The present disclosure represents a significant advancement in information management within vehicles, offering practical solutions to longstanding challenges.

20 Claims, 5 Drawing Sheets

(56) References Cited

U.S. PATENT DOCUMENTS

2020/0101844 A1\* 4/2020 Miller, Jr. .............. B60K 35/00

FOREIGN PATENT DOCUMENTS

| CN | 117331574 A * | 1/2024 |
|---|---|---|
| DE | 102022210557 A1 * | 4/2024 |
| KR | 102664602 B1 * | 5/2024 |
| WO | 2020100119 A1 | 11/2019 |
| WO | WO-2022249202 A1 * | 12/2022 |
| WO | WO-2024069958 A1 * | 4/2024 |

\* cited by examiner

METHOD AND A SYSTEM FOR PROVIDING AN ENCRYPTED FILE TO AN AUTHORIZED ENTITY

TECHNICAL FIELD

The present disclosure is related primarily in the realm of vehicle technology. More specifically, the disclosure focuses on information management and security within vehicles. This method addresses the need for securely storing and accessing various files and information associated with both the vehicle and its user. The present disclosure combines elements of automotive technology, data encryption, user authentication, and document management to create a system that enhances convenience while prioritizing security and privacy.

BACKGROUND

In the realm of vehicle technology, the management of information related to the vehicle and its users poses significant challenges. Traditional methods often involve physical files or less secure digital storage systems. However, these approaches are fraught with shortcomings, including security vulnerabilities and limited accessibility. Users typically store files such as driver's licenses, insurance papers, and vehicle registration files in the vehicle's glove compartment or other physical storage spaces. Physical files are susceptible to theft or damage, compromising the security of sensitive information. Retrieving physical files can be cumbersome, especially in emergency situations, potentially delaying essential actions such as contacting emergency services or providing necessary information to authorities. Some users may opt to store digital copies of files on external devices like USB flash drives or SD cards, which can be plugged into the vehicle's infotainment system or other electronic interfaces. External storage devices are prone to loss or theft, and if left connected to the vehicle, they can be accessed by unauthorized individuals. Users may forget to carry or update external storage devices, leading to outdated or inaccessible information when needed. Cloud-based services allow users to store files digitally and access them remotely via the internet, often through smartphone apps or web interfaces. Cloud-based storage solutions may raise concerns regarding data privacy and security breaches, especially if not properly encrypted or protected. Accessing files stored in the cloud requires a stable internet connection, which may not be available in all situations, such as remote or rural areas or during network outages. In some cases, verification of files and user information may rely on manual processes, such as visually inspecting physical files or contacting relevant authorities. Manual verification processes can be time-consuming and inefficient, leading to delays in accessing necessary information or services, especially during emergencies. Manual processes are susceptible to human error, increasing the risk of inaccuracies or oversight in verifying document authenticity or user identity.

Conventionally, physical document storage users traditionally store physical files such as driver's licenses, insurance papers, and registration files in the vehicle's glove compartment or other storage compartments. Physical files are vulnerable to theft, loss, or damage, compromising the security of sensitive information. Retrieving physical files can be inconvenient, especially in emergency situations, potentially delaying essential actions. Some vehicle owners or operators rely on paper-based systems for document management, including filing cabinets or folders stored in the vehicle. Paper files are susceptible to damage from environmental factors such as moisture, heat, or wear and tear. Managing and organizing paper files can be cumbersome, leading to inefficiencies and errors in document retrieval. Verification of files and user information may rely on manual processes, such as visually inspecting physical files or contacting relevant authorities. Manual verification processes can be time-consuming and labor-intensive, leading to delays in accessing necessary information or services. Manual processes are prone to human error, increasing the risk of inaccuracies or oversight in verifying document authenticity or user identity. Some users may use standalone digital storage devices like USB flash drives or SD cards to store digital copies of files, which can be plugged into the vehicle's infotainment system. Digital storage devices are susceptible to loss, theft, or unauthorized access if left connected to the vehicle. Users may forget to update or carry digital storage devices, leading to outdated or inaccessible information when needed. These conventional methods have various shortcomings, including security vulnerabilities, limited accessibility, dependence on manual processes, and susceptibility to loss or damage. The disclosure addresses these challenges by providing a secure, convenient, and integrated solution for managing information within the vehicle environment. CN105448101A discloses a method and system designed to certify the legitimacy of both a vehicle and its human pilot. This process involves obtaining vehicle information, comparing it with pre-stored data, and handling any failures or obstructions encountered during the certification process. Notable features of the prior art include safety certification of the authenticating party, the use of roadside devices for communication, ensuring interaction data security, employing various communication modules, and utilizing electronic driving cards. In contrast to CN105448101A, the present disclosure describes a method and system focused on providing access to and managing files associated with a vehicle and its user in any form. This method involves tasks like collecting user input for vehicle connection, uploading files, encrypting them for storage, and granting access to authorized parties using a decryption key. These files can encompass various forms of information, including but not limited to audio files, video files (such as AVI, MPEG, and way formats), PDF files, Word files, Excel files, and any other digital format. Noteworthy features encompass the utilization of electronic devices within the vehicle, uploading files via user computing devices, labeling documents based on user inputs, employing various input methods including passwords and biometrics, transmitting documents to user computing devices, storing documents in external storage media, displaying documents on vehicle screens, retaining and deleting documents based on predefined time intervals, and including various types of files such as driver registration, licenses, insurance information, etc. Additionally, security measures for stolen vehicles, emergency transmission of documents, and the inclusion of rented vehicle information are also highlighted.

WO2020100119A1 discloses and focuses on preventing violations and theft of vehicles using driving license verification. This disclosure involves verifying the authenticity of driving licenses and facilitating vehicle operation based on verification status. This disclosure does not involve document handling as it is primarily concerned with driving license verification. Also, this disclosure does not include provisions for transmitting information to external entities beyond vehicle operation. This disclosure's primary focus is on modules for registration, verification, processing, and information storage within the vehicle. User interaction is primarily through the driving license verification process. This disclosure deals with vehicle security through driving license verification. In Contrast to WO2020100119A1 the present disclosure concentrates on providing information related to the vehicle and its user, including document storage and retrieval. The present disclosure requires user authorization to access the vehicle and input of a decryption key to access stored documents. This disclosure also includes uploading, storing, and providing access to various files associated with the user and the vehicle. Further, present disclosure allows for providing files to authorized entities, especially in emergency situations or for rental purposes. The present disclosure requires user input for connection, potentially using various methods like passwords, voice, or biometrics. The present disclosure focuses on managing and providing access to various files related to the vehicle and its user, with emphasis on security and user interaction. Further limitations and disadvantages of conventional and traditional approaches will become apparent to one of skill in the art, through comparison of described systems with some aspects of the present disclosure, as set forth in the remainder of the present application and with reference to the drawings The disclosure addresses the challenge of managing information within a vehicle environment, a tangible domain with practical implications. The disclosure provides a concrete solution by utilizing electronic devices, encryption techniques, user authentication methods, and integration with vehicle systems. The solution provided by the present disclosure involves practical elements such as electronic devices installed in vehicles, encryption techniques to secure stored information, and user authentication methods to control access. The disclosure offers a tangible method for securely storing and accessing files related to the vehicle and its users, enhancing the management of information in a real-world setting. The disclosure utilizes electronic devices within vehicles to facilitate information management, demonstrating a concrete application of technology. The disclosure incorporates encryption techniques to ensure the security of stored files, addressing a specific technical challenge in data protection. User authentication methods such as passwords, voice inputs, and biometrics, are employed to control access to stored information, adding another layer of practical functionality to the solution. The solution integrates with existing vehicle systems, emphasizing its practical implementation within real-world environments. This integration enhances the usability and effectiveness of the solution, making it a tangible advancement in the field of information management within vehicles. The present disclosure provides a concrete solution to a specific technical problem within a practical and tangible domain, thereby circumventing abstract ideas and advancing prior art.

SUMMARY

The forgoing summary is illustrative only and is not intended to be in any way limiting. In addition to the illustrative aspects, embodiments, and features described above, further aspects, embodiments, and features will become apparent by reference to the drawings and the following detailed description. In an embodiment, the electronic device disposed in the vehicle, is configured to receive an input from a user to establish connection with the vehicle. In an embodiment, based on the input, the user is authorized to access the vehicle. In an embodiment, the electronic device disposed in the vehicle, is configured to upload one or more files associated with the user and the vehicle. In an embodiment, the electronic device disposed in the vehicle, is configured to store the one or more files in the vehicle's memory. The present disclosure document includes various forms of information, such as audio files, video files (in formats like AVI, MPEG, WAV, etc.), PDF files, Word files, and Excel files. The document management system allows users to store and access a wide range of information in various formats within their vehicle. Users can upload and store audio files, such as music tracks, podcasts, or audio instructions, in formats like MP3, WAV, or AAC. Users can also upload video files, including instructional videos, entertainment videos, or personal recordings, in formats like AVI, MPEG, MP4, or MOV. Files in PDF format, such as manuals, contracts, or brochures, can be uploaded and accessed conveniently within the vehicle's interface. Users can upload files in Microsoft Word (.doc, .docx) or Excel (.xls, .xlsx) formats, enabling access to spreadsheets, reports, or other textual information. The document management system securely stores these files in the vehicle's memory, ensuring that they are readily accessible to users whenever needed. Whether it's listening to music, watching a video, reviewing a contract, or accessing important files, users can easily retrieve the information from their vehicle's interface. By providing the capability to store and access information in various formats, the document management system enhances user convenience and versatility. Whether the user wants to listen to their favorite songs, watch a tutorial video, review a rental agreement, or reference a spreadsheet, they can do so seamlessly from within the vehicle. Users also have the option to download selected files to their smartphones for offline access during the rental period. This ensures that they can continue to enjoy their preferred content even when outside of cellular or Wi-Fi coverage areas. The document management system is designed to support a wide range of file formats and provides a user-friendly interface for browsing, selecting, and accessing information in any form. This comprehensive approach ensures that users can store and manage all kinds of information from the vehicle, enhancing their overall experience. By incorporating support for various information formats, the document management system caters to the diverse needs and preferences of users, allowing them to make the most of their time in the vehicle while staying organized and informed.

In an embodiment, one or more files being stored in an encrypted form and the one or more files being stored in the encrypted form to one or more authorized entities based on input of a decryption key by the user. In an embodiment, the decryption key is configured to decrypt the one or more files. In an embodiment, the electronic device corresponds to at least one of an instrument cluster, a secondary display screen, a speaker system, a heads-up display. In an embodiment, the electronic device being disposed within the user's view. In an embodiment, the one or more files being provided for uploading via a user computing device of the user. In an embodiment, the user computing device being communicatively coupled with the vehicle using a wired or wireless connection. In an embodiment, the wireless connection corresponds to at least one of Bluetooth, Wi-Fi, or ZigBee. In an embodiment, comprises transmission of the one or more files to the user computing device of the user. In an embodiment, the one or more files are stored in the user computing device. In an embodiment, the one or more files may be downloaded to an external storage media. In an embodiment, the external storage media comprises at least one of a flash drive, a SD card, optical storage device, or a hard drive. In an embodiment for providing information, the one or more files may be displayed on a display screen of the vehicle. In an embodiment, the one or more files are stored in the memory of the vehicle or the user computing device of the user for a pre-defined time interval. In an embodiment, the time interval is indicative of a time for which the user has rented the vehicle. In an embodiment, the method for providing information comprises deleting the one or more files being stored in the memory of the vehicle after expiry of the pre-defined time interval. In an embodiment, the one or more files comprises a driver registration, a driver's license, insurance information of the vehicle, vehicle renter contracts, medical information, emergency contact information, vehicle purchase information, vehicle service records, vehicle recall information, audio and video instruction or informational files, and any other personal information of the user.

In an embodiment, if the vehicle is stolen then the one or more files are unavailable to unauthorized parties as the one or more files are being stored in the encrypted form. In an embodiment, the one or more files may be transmitted to one or more authorized entities in case of an emergency associated with the vehicle. In an embodiment, the emergency corresponds to an accident. In an embodiment, if the vehicle is a rented vehicle, then vehicle related information is uploaded by an authorized user of a rental company of the vehicle. In an embodiment, each of the one or more files may be labeled based on one or more inputs from the user. In an embodiment, the input corresponds to at least one of a password, a voice input, a biometric input, a fingerprint, or a facial id. In an embodiment, the input being captured using one or more sensors. In an embodiment, the sensors comprise a finger print sensor, an image sensor, and a microphone. The disclosure further enhances practicality by storing files in an indexed database, facilitating easy retrieval by users. The disclosure by utilizing an indexed database allows for efficient organization and retrieval of stored files, enhancing user experience and usability. This feature contributes to the overall effectiveness of the solution by providing a streamlined method for accessing stored information within the vehicle environment. By leveraging indexed database technology, the solution demonstrates a commitment to practical implementation and user-centric design, further distinguishing it from abstract concepts and advancing the state of the art information management within vehicles a system for providing information, the system comprising a processor and a memory storing instructions for execution by the processor. In an embodiment, the hardware processor is configured by the instructions to receive, by an electronic device disposed in a vehicle, an input from a user to connect with the vehicle. The hardware processor is configured by the instructions to upload by the electronic device disposed in the vehicle one or more files associated with the user and the vehicle. The hardware processor is configured by the instructions to the one or more files in a memory of the vehicle. In an embodiment, one or more files being stored in an encrypted form and the hardware processor is configured by the instructions to provide the one or more files being stored in the encrypted form to one or more authorized entities based on input of a decryption key by the user. In an embodiment, the decryption key is configured to decrypt the one or more files. In an embodiment, the electronic device corresponds to at least one of an instrument cluster, a secondary display screen, a heads-up display. In an embodiment, the electronic device being disposed within the user's view. In an embodiment, the one or more files being provided for uploading via a user computing device of the user. In an embodiment, the user computing device being communicatively coupled with the vehicle using a wired or wireless connection. In an embodiment, the wireless connection corresponds to at least one of Bluetooth, Wi-Fi, or ZigBee. The system of providing information which comprises labeling each of the one or more files based on one or more inputs from the user. In an embodiment, the input corresponds to at least one of a password, a voice input, a biometric input, a fingerprint, or a facial. The input is captured using one or more sensors. In an embodiment, the sensors comprise a finger print sensor, an image sensor, and a microphone. The system of providing information comprises transmitting the one or more files to the user computing device of the user. The one or more files may be stored in the user computing device. The system of providing information comprises downloading the one or more files to an external storage media. In an embodiment, the external storage media comprises at least one of a flash drive, a SD card, or a hard drive. The system provides the one or more files which comprises displaying the one or more files on a display screen of the vehicle. In an embodiment, the one or more files being stored in the memory of the vehicle or the user computing device of the user for a pre-defined time interval. The time interval is indicative of a time for which the user has rented the vehicle. The system of providing information comprises deleting the one or more files being stored in the memory of the vehicle after expiry of the pre-defined time interval. In an embodiment, the one or more files comprises a driver registration, a driver's license, insurance information of the vehicle, vehicle renter contracts, medical information, emergency contact information, vehicle purchase information, vehicle service records, and any other personal information of the user. In a particular embodiment, in the event of vehicle theft, measures are implemented to ensure that the stored files remain inaccessible to unauthorized parties. This is achieved by storing the files in encrypted form, thereby preventing unauthorized access to sensitive information.

The system of providing information which transmits the one or more files to one or more authorized entities in case of an emergency associated with the vehicle and the emergency may correspond to an accident. In an embodiment, if the vehicle is rented then vehicle related information is uploaded by an authorized user of a rental company to the vehicle. The disclosure provides a method for securely managing and accessing information within a vehicle environment. The present disclosure involves an electronic device installed in the vehicle, such as an instrument cluster, secondary display screen, or head-up display, within the user's view. The method comprises several key steps. User authorization and input is performed via the electronic device. The electronic device receives input from the user to connect with the vehicle, thereby authorizing access. This input can include passwords, voice commands, or biometric data captured through sensors like fingerprint sensors, image sensors, or microphones. Upon authorization, the electronic device uploads one or more files associated with the user and the vehicle. These files may include driver registration, licenses, insurance information, contracts, medical data, and more. Importantly, the files are stored in encrypted form within the vehicle's memory to ensure security. There are a number of different types of encryptions, which include AES (Advanced Encryption Standard), RSA (Rivest-Shamir-Adleman), DES (Data Encryption Standard), 3DES (Triple Data Encryption Standard), Blowfish, Twofish, RC4 (Rivest Cipher 4), ChaCha20, Serpent and IDEA (International Data Encryption Algorithm). To access the stored files the user inputs a decryption key, which is configured to decrypt the encrypted files. This provides an additional layer of security, ensuring that sensitive information remains protected unless explicitly accessed by an authorized user. Once decrypted, the electronic device can provide the files to authorized entities, either by displaying them on the vehicle's screen, transmitting them to the user's computing device, or downloading them to external storage media like flash drives or SD cards. The method includes provision for storing files for a predefined time interval, such as the duration of a vehicle rental period. After this interval expires, the files are automatically deleted from the vehicle's memory to prevent unauthorized access. In case of emergencies such as accidents, the method allows for the transmission of files to authorized entities to facilitate necessary actions. This ensures that critical information is readily available when needed most. The present disclosure combines convenience with robust security measures to address the challenges of managing and accessing sensitive information within the vehicle environment. By integrating various technologies and implementing encryption and authentication mechanisms, it enhances both security and ease of user experience, providing a comprehensive solution for information management in vehicles.

BRIEF DESCRIPTION OF DRAWINGS

The accompanying drawings illustrate the various embodiments of methods and other aspects of the disclosure. Any person with ordinary skills in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Further, the elements may not be drawn to scale.

Various embodiments will hereinafter be described in accordance with the appended drawings, which are provided to illustrate and not to limit the scope in any manner. In an embodiment, similar designations denote similar elements, and in which.

DETAILED DESCRIPTION

Figure 1:
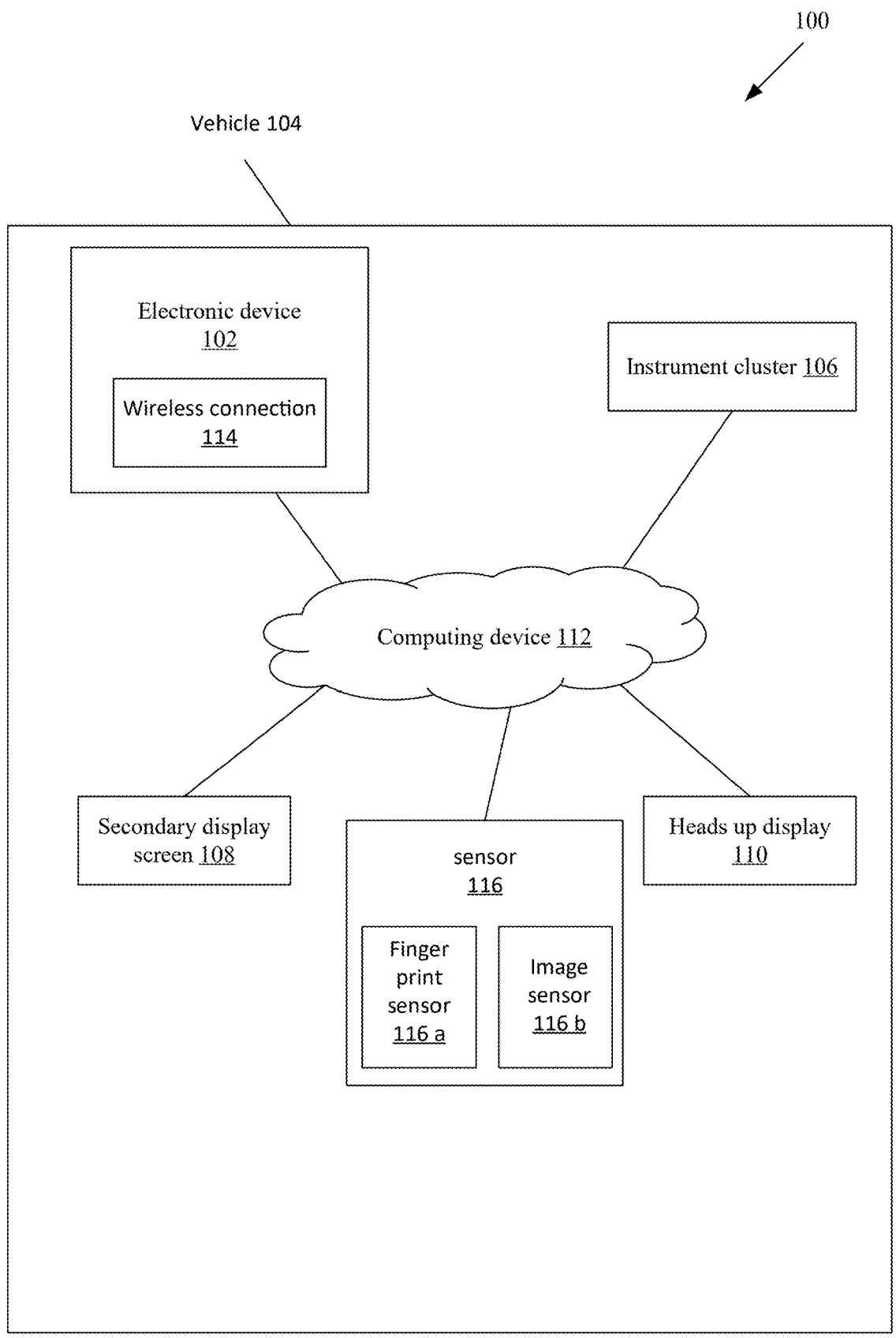
FIG. 1 is a block diagram that illustrates a system environment in which various embodiments of the method may be implemented.

The present disclosure may be best understood with reference to the detailed figures and description set forth herein. Various embodiments are discussed below with reference to the figures. However, those skilled in the art will readily appreciate that the detailed descriptions given herein with respect to the figures are simply for explanatory purposes as the method may extend beyond the described embodiments. For example, the teachings presented, and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on indicate that the embodiment(s) or example(s) may include a particular feature, structure, characteristic, property, element or limitation but that not every embodiment or example necessarily includes that particular feature, structure, characteristic, property, element or limitation. Further, repeated use of the phrase "in an embodiment" does not necessarily refer to the same embodiment.

The primary objective of the disclosure is to provide users with enhanced security. The objective of the present disclosure is to implement robust encryption mechanisms to securely store sensitive information within the vehicle, ensuring that files remain protected from unauthorized access or theft. Present disclosure enables authorized users to easily access their stored files within the vehicle environment, providing a seamless and user-friendly experience. Another objective of the present disclosure is to utilize various authentication methods, including passwords, voice commands, and biometric data, to verify user identity and authorize access to stored files. Another objective of the disclosure is to enable quick and efficient access to critical information, such as medical data or insurance details, during emergencies such as accidents, facilitating prompt response and assistance. One another objective of the disclosure is to provide a centralized system for managing and organizing various files related to the vehicle and its users, reducing the reliance on manual processes and physical storage methods. One another objective of the disclosure is to implement measures to comply with data privacy regulations and safeguard user privacy, thereby instilling trust in the handling of sensitive information. Present disclosure also offers a seamless and integrated solution for information management within the vehicle, enhancing overall user satisfaction and convenience. Another objective of the disclosure is to cater to the needs of rental companies and fleet operators by enabling efficient management of vehicle-related files and information, facilitating smoother operations and customer service. The present disclosure allows a vehicle user, or a company providing files for the vehicle such as a rental company, to time base the files such that the files will disappear after a predetermined period of time, or at the users or file providers discretion. Other objective of the disclosure is to design the system to be adaptable to different vehicle models and configurations, as well as scalable to accommodate future technological advancements and user requirements. Another objective of the disclosure is to minimize the risk of losing or damaging physical files by providing a secure and digital alternative for storing and accessing important information within the vehicle.

FIG. 1 is a block diagram that illustrates a system environment 100 in which various embodiments of a method and system for providing information may be implemented. System environment 100 typically includes an electronic device 102. The electronic device 102 comprises Instrumental cluster 106, Secondary display screen 108, Sensor 116 further comprises finger print sensors 116 *a*, and an image sensor 116 *b*, Heads up display 110.

Electronic Device 102 serves as a pivotal component within the vehicle, responsible for a range of essential functions that enhance user interaction, data management, and system integration. The electronic device accepts user commands through various input methods like touchscreens, physical buttons, voice recognition, or gesture controls. The electronic device 102 is configured to manage the uploading and storage of files pertinent to the vehicle's operation and user manuals. The electronic device 102 is configured to employ encryption algorithms to safeguard sensitive information and communication within the vehicle's systems. Further, the electronic device 102 is configured to manage the authentication process to ensure that only authorized users can access specific functions or data. Once authenticated, users can securely access stored information, files, or system settings. Further, the electronic device 102 seamlessly communicates with other vehicle systems, including sensors, processors, and communication modules, to ensure smooth operation. The electronic device 102 offers an intuitive interface with touchscreens, physical buttons, voice recognition, and gesture controls, facilitating easy interaction for users. The electronic device's 102 strategic placement, whether within the instrument cluster, secondary display screen, or head-up display, ensures convenient access and visibility for users while driving. The electronic device 102 acts as the central hub for user interaction, data management, and system integration within the vehicle, significantly enhancing the driving experience while prioritizing both convenience and security.

The instrument cluster 106 is a vital component of a vehicle's dashboard, providing drivers with essential operational information. Positioned centrally within the driver's line of sight, the instrument cluster 106 presents key data such as speed, RPM, fuel level, temperature, and system warnings. This instrument cluster 106 typically comprises analog or digital displays, offering either physical needles or electronic screens for information presentation. In modern vehicles, the instrument cluster 106 may also integrate multifunction displays (MFDs) or infotainment systems for navigation, audio controls, and diagnostics. With buttons, knobs, or touch-sensitive controls, drivers can interact with the cluster, toggling between displays, adjusting settings, and acknowledging alerts. The instrument cluster 106 is integrated with the vehicle's systems like the engine control unit (ECU) and transmission control unit (TCU). The instrument cluster 106 receives real-time data about the vehicle parameters for safe operation. Furthermore, the instrument cluster may incorporate safety features like heads-up displays (HUDs) or driver assistance systems to enhance awareness and prevent accidents.

Head-up Display (HUD) 110 technology revolutionizes the driving experience by projecting vital information directly onto the windshield or a transparent screen within the driver's field of vision. This system ensures that drivers can access crucial data without diverting their attention from the road or glancing at the instrument cluster. HUDs utilize various projection methods, including windshield projection, where information appears on a specialized section of the windshield through a transparent reflective coating, creating a virtual image. Alternatively, some vehicles integrate a dedicated transparent screen positioned above the dashboard or within the instrument cluster, onto which HUDs project information, conveniently within the driver's line of sight. HUDs 110 offer a wealth of information essential for driving, prominently displaying current vehicle speed for easy monitoring. Turn-by-turn navigation directions from the vehicle's navigation system provide seamless guidance without requiring a separate display on the HUD 110. Additionally, real-time safety alerts such as collision warnings, lane departure warnings, and speed limit information enhance driver awareness and safety. Information regarding vehicle systems like fuel level, engine temperature, and tire pressure may also be displayed, keeping drivers informed about their vehicle's status. The HUDs receive real-time data and seamlessly display relevant information, contributing to improved safety and convenience. By minimizing distractions and presenting information directly in the driver's line of sight, HUDs help maintain situational awareness and enable quicker responses to changing road conditions. Ultimately, HUD technology enhances the driving experience by providing convenient access to critical information, reducing cognitive load, and improving overall comfort and safety on the road.

Secondary display screen 108 refers to an additional screen or monitor within the vehicle's cabin, typically positioned in a location accessible to both the driver and passengers, but not serving as the primary instrument cluster or dashboard display. The secondary display screen 108 serves as a supplementary interface for accessing vehicle information, entertainment options, navigation features, and various settings. Secondary display screen 108 complements the primary instrument cluster 106 and may offer additional functionality and convenience. Secondary display screens 108 are commonly located in the center console, dashboard, or rear seat entertainment system. Secondary display screens 108 are strategically positioned to ensure optimal visibility and accessibility for both the driver and passengers. Secondary display screens 108 may feature touch-sensitive or non-touch screens, depending on the design and manufacturer specifications. Touchscreen displays allow users to interact directly with the screen, while non-touch screens may require input from physical buttons or controls. Secondary display screens 108 can present a wide range of information. Users can access audio and video playback options, radio stations, streaming services, and multimedia content. Integrated navigation systems provide real-time maps, turn-by-turn directions, points of interest, and traffic information. Users can adjust vehicle settings such as climate control, lighting, seating positions, and driver assistance features. Secondary display screen 108 may support hands-free calling, text messaging, and access to smartphone applications via Bluetooth or other connectivity options. Secondary display screen 108 is integrated with the vehicle's onboard systems, including the infotainment system, navigation system, and connectivity features. They receive data and commands from these systems to provide a seamless user experience. Some secondary display screens 108 offer customization options, allowing users to personalize the display layout, themes, colors, and displayed information according to their preferences. In vehicles equipped with rear seat entertainment systems, secondary display screens 108 provide entertainment options for passengers, including movies, games, and multimedia content, enhancing the overall passenger experience during long journeys. Secondary display screens 108 should be designed and positioned to minimize distractions and ensure that drivers can maintain their focus on the road. Features such as voice commands, steering wheel controls, and heads-up displays (HUDs) may be implemented to enhance safety while using secondary display screens 108. Secondary display screens 108 enhance the functionality, convenience, and entertainment options within the vehicle cabin, providing users with access to a wide range of features and information while on the road.

Sensors 116 refer to electronic components or devices within the vehicle that detect and capture various types of data, enabling the vehicle's systems to monitor its surroundings, assess its performance, and interact with users. Sensors 116 serve to gather data about the vehicle's environment, internal systems, and user interactions. They convert physical quantities such as temperature, pressure, light, sound, or motion into electrical signals that can be processed by the vehicle's electronic control units (ECUs) or other onboard systems. Vehicles are equipped with a wide range of sensors.

Fingerprint sensor 116a is a biometric sensor that captures and analyzes fingerprints to authenticate a user's identity. A fingerprint sensor 116a detects and measures unique patterns of ridges, valleys, and minutiae present on an individual's fingertip. These patterns are then converted into a digital representation, known as a fingerprint template, which is used for authentication purposes. Fingerprint sensor 116a utilizes various technologies to capture fingerprint images and extract features for identification. Modern fingerprint sensors 116a use capacitive technology, which detects the electrical conductivity of the ridges and valleys on the fingertip. When a finger is placed on the sensor, it creates a pattern of electrical charges that is analyzed to generate a fingerprint image. Optical sensors use light to capture fingerprint images. When a finger is placed on the sensor, an image of the fingerprint is captured using optical scanning techniques. Ultrasonic sensors emit ultrasonic waves that penetrate the outer layers of the skin to capture detailed images of the fingerprint's sub-dermal features. This technology offers high accuracy and resistance to spoofing. Thermal sensors detect the heat patterns left by the ridges and valleys of the fingerprint. These sensors measure temperature differences between the fingerprint and the surrounding surface to create a unique thermal fingerprint image. The authentication process typically starts with enrollment. During enrollment, the user's fingerprint is captured by the sensor and stored securely as a reference template in a database. When the user attempts to access a system or device, they place their finger on the sensor, and the captured fingerprint is compared to the stored template. If the patterns match within a predefined threshold, the user is authenticated and granted access. Fingerprint sensors are evaluated based on their ability to accurately identify individuals while minimizing false rejections (legitimate users being denied access) and false acceptances (unauthorized users being granted access). Fingerprint sensors 116a are used in a wide range of applications, including access control. Fingerprint sensors 116a are commonly used to control access to secure locations, buildings, and electronic devices. Fingerprint sensors 116a provide a secure and convenient method of biometric authentication, enabling users to access systems and devices with confidence while protecting sensitive information from unauthorized access. In the context of the claimed invention, a fingerprint sensor may be used as a user authentication method for accessing and managing information within the vehicle environment.

Image sensor 116b is a semiconductor device that converts optical images into electronic signals. Image sensor 116b essentially the "eye" of a digital camera or any device capable of capturing images. Image sensors are primarily used in digital cameras, smartphones, tablets, security cameras, and various other imaging devices. Image sensors 116b consist of an array of millions of pixels. Each pixel contains a photosensitive element that absorbs photons of light and generates an electrical charge proportional to the intensity of the light. As light enters the sensor, light causes electrons to be released within the pixels. The number of electrons released is directly proportional to the brightness and color of the incident light. These electrons accumulate in each pixel's capacitor. After a certain exposure time, the accumulated charge in each pixel is converted into an analog voltage. This voltage signal represents the intensity of light that fell on the pixel during the exposure. The analog voltage signals from all pixels are then converted into digital values through an analog-to-digital converter. This process assigns a discrete numerical value to each pixel's intensity level, resulting in a digital image. There are different types of Image Sensors. Charge-Coupled Device (CCD) sensors use a complex arrangement of capacitors to transport charge across the chip for readout. They offer high image quality but consume more power and are slower compared to CMOS sensors. Complementary Metal-Oxide-Semiconductor (CMOS) sensors integrate amplifiers, A/D converters, and other circuitry directly onto the sensor chip, resulting in lower power consumption and faster operation. They are the predominant type used in most modern digital cameras and devices. Larger pixels generally capture more light and produce better image quality, especially in low-light conditions. Image sensors may use color filter arrays (such as Bayer filters) to detect different wavelengths of light and reproduce color information accurately. It is to be noted that in another embodiment there may be multiple image sensors in the vehicle.

Computing device 112, often referred to simply as a computer, is a broad term encompassing a wide range of electronic devices capable of processing data. These devices manipulate, store, and communicate information using digital signals. Computing Device includes components like Central Processing Unit (CPU). The CPU is the brain of the computer, responsible for executing instructions and performing calculations. CPU controls the flow of data within the system and interacts with other components such as memory and storage. Random Access Memory (RAM) stores data and program instructions temporarily while the computer is powered on. RAM allows for quick access to data needed for current tasks, providing faster processing speeds compared to permanent storage devices like hard drives. Hard Disk Drives (HDDs) and Solid-State Drives (SSDs) are common storage devices used to store data permanently. HDDs use spinning magnetic disks to store data, while SSDs use flash memory for faster access speeds and better reliability. Input devices allow users to interact with the computer and input data. Common examples include keyboards, mice, touchpads, and touchscreens. Other input devices such as microphones and cameras enable input of audio, video, and images. Output devices display processed data to users. Common examples include monitors, printers, speakers, and headphones. Displays come in various types, such as LCD, LED, OLED, and CRT, offering different resolutions and image quality. The motherboard is a large circuit board that connects and integrates all internal components of the computer. Motherboard provides communication pathways between components and houses the CPU, memory slots, expansion slots, and other essential connectors. Graphics Processing Unit is responsible for rendering images and graphics, especially in tasks like gaming, video editing, and 3D modeling. Servers are specialized computers designed to provide services, resources, or data to other computers or devices on a network. Embedded systems are computing devices integrated into other systems or products, such as appliances, automobiles, and industrial equipment. Mobile devices include smartphones, tablets, and wearable devices, offering computing capabilities in a compact and portable form factor.

Functions of Computing Device 112 execute programs and algorithms to process data, perform calculations, and generate results. Computing device 112 is configured to store data and program files in memory and storage devices for later retrieval and use. Computing devices 112 enable communication and data exchange between users, devices, and networks through various input/output interfaces. Computing device 112 run software applications and utilities designed for specific tasks, such as word processing, multimedia editing, and web browsing.

Figure 2:
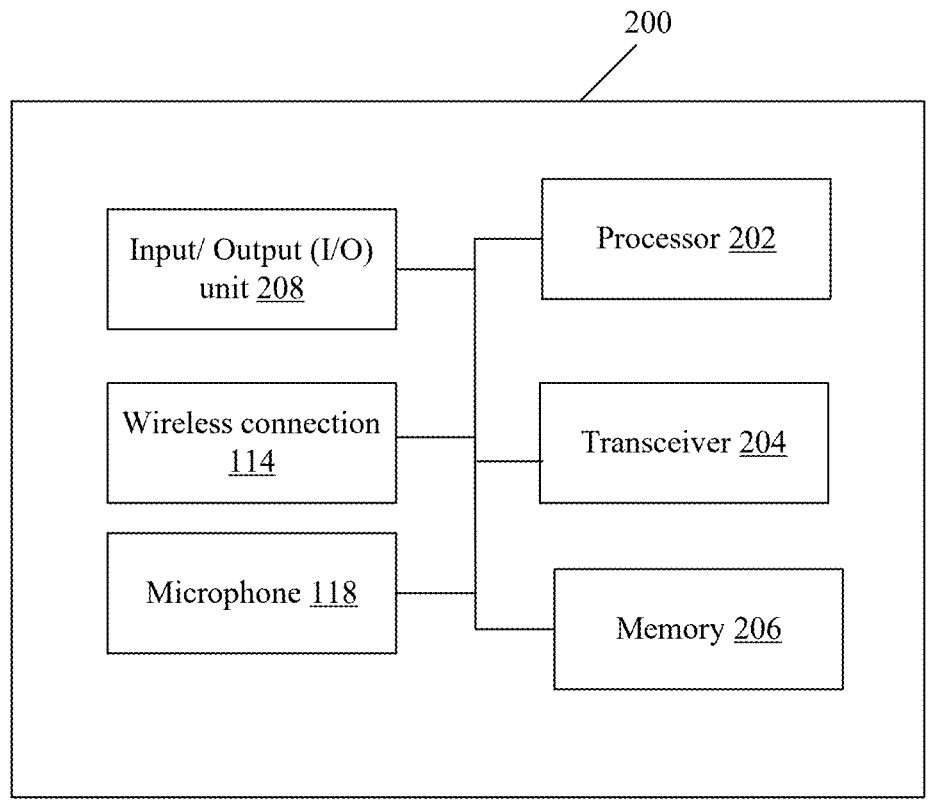
FIG. 2 is a block diagram that illustrates a system for providing information in accordance with an embodiment of the present disclosure.

FIG. 2 is a block diagram that illustrates a method and system for providing information configured to process the dictated instructions in accordance with an embodiment of the present disclosure. FIG. 2 is explained in conjunction with elements from FIG. 1. Here, the electronic device 102 preferably includes a processor 202, Transceiver 204, Memory 206, Input/Output (I/O) unit 208, Wireless connection 114, Microphone 118 is preferably communicatively coupled to each other and to the computing device 112.

Processor 202 comprises suitable logic, circuitry, interfaces, and/or code that may be configured to execute a set of instructions stored in the memory 204. The processor 202 may be implemented based on a number of processor technologies known in the art. Examples of the processor 202 include, but not limited to, an X86-based processor, a Reduced Instruction Set Computing (RISC) processor, an Application-Specific integrated Circuit (ASIC) processor, a. Complex Instruction Set Computing (CISC) processor, and/or other processor. Comprises suitable logic circuitry interfaces and/or code that may be configured to execute a set of instructions stored in the memory 204 and may be implemented based on several processor technologies known in the art.

The processor 202 works in coordination with the Transceiver 204, Memory 206, Input/Output (I/O) unit 208, Wireless connection 114, Microphone 118. The processor 202 is involved in cleaning apparatus processing within a communication unit. The processor in an electronic device within the context of the provided information serves as the central processing unit (CPU) responsible for executing instructions, performing calculations, and managing data within the device. The processor acts as the brain of the electronic device 102, carrying out various tasks to facilitate the operation of the device and its associated functionalities. It executes software instructions, processes data, and coordinates communication between different components within the device.

Transceiver 204 in an electronic device refers to a component that combines the functionality of a transmitter and a receiver, allowing the device to both send and receive signals wirelessly. A transceiver 204 enables the electronic device to communicate wirelessly with other devices or systems by transmitting and receiving electromagnetic signals. A transceiver 204 serves as the interface between the device and the wireless communication medium, facilitating data exchange and interaction. The transmitter component of the transceiver 204 is responsible for converting digital data into electromagnetic signals suitable for transmission over the wireless communication medium. Transceiver 204 modulates the data onto a carrier signal and amplifies it to the appropriate power level for transmission. The receiver component of the transceiver detects and demodulates incoming electromagnetic signals, extracting the original digital data from the received signal. Transceiver 204 amplifies and filters the incoming signal to enhance signal quality and minimize interference, enabling accurate data reception. Transceiver 204 support various wireless communication protocols, such as Bluetooth, which is used for short-range wireless communication between devices, typically within a range of around 10 meters (33 feet). Bluetooth transceivers enable features such as wireless audio streaming, file sharing, and device pairing. Wi-Fi is used for high-speed wireless data transfer over longer distances, typically within a range of several hundred feet. Wi-Fi transceivers enable internet connectivity, local network access, and streaming media. Cellular (e.g., 4G/LTE, 5G) is used for wide-area wireless communication over cellular networks, enabling voice calls, messaging, internet access, and other mobile services. RFID (Radio Frequency Identification) is used for short-range wireless identification and tracking of objects, enabling applications such as contactless payment, access control, and inventory management. Transceivers are integrated with other components within the electronic device, such as the processor, memory, input/output interfaces, and antennas. They work in conjunction with these components to enable wireless communication and data exchange. The transceiver 204 is connected to an antenna that transmits and receives electromagnetic signals. The antenna plays a crucial role in ensuring efficient signal transmission and reception, and its design and placement are optimized for the specific wireless communication protocol used by the transceiver 204. Transceivers 204 may incorporate power management features to optimize power consumption and extend battery life in battery-powered devices. Power-saving modes, adaptive transmission power control, and sleep/wake cycles are used to minimize energy consumption during periods of inactivity. Transceivers are essential components of electronic devices, enabling wireless communication and connectivity.

The memory 204 may include suitable logic, circuitry, interfaces, and/or code that may be configured to store the set of instructions, which are executed by the processor 202. In an embodiment, the memory 204 may be configured to store one or more programs, routines, or scripts that may be executed in coordination with the processor 202. The memory 204 may be implemented based on a Random Access Memory (RAM), a Read-Only Memory (ROM), a Hard Disk Drive (HDD), a storage server, optical storage, and/or a Secure Digital (SD) card.

Input/output unit (I/O unit) 208 typically refers to a component or subsystem within a computing system that facilitates the exchange of data between the system and external devices. The primary function of an input/output unit is to manage the flow of data between the central processing unit (CPU) or main memory and external devices, such as storage devices, displays, keyboards, mice, printers, network interfaces, and other peripherals. An Input/Output unit 208 handles incoming data from external devices and transfers it to the CPU or main memory for processing. This includes data from keyboards, mice, touchscreens, scanners, sensors, and other input devices. The Input/Output unit 208 typically performs data buffering, error checking, and data conversion as needed. Input/Output unit 208 manages outgoing data from the CPU or main memory to external devices for display, printing, storage, or communication. This includes sending data to displays (monitors, screens), printers, storage devices (hard drives, solid-state drives), network interfaces, and other output devices. Input/output units 208 employ various data transfer methods depending on the nature of the devices involved and the system architecture. The CPU initiates data transfers by issuing specific commands to the Input/Output unit 208. DMA is a method where an Input/Output unit 208 can transfer data directly to or from memory without CPU intervention. DMA reduces CPU overhead and improves system performance by offloading data transfer tasks from the CPU. The Input/Output unit 208 includes control logic and interfaces for communicating with external devices. This control logic manages device initialization, configuration, status monitoring, error handling, and coordination of data transfers between the CPU, memory, and devices. Input/Output unit 208 often incorporate buffers and caches to temporarily store data during transfer operations. Buffers smooth out data flow between devices operating at different speeds, while caches improve performance by storing frequently accessed data closer to the CPU or memory. Input/Output unit 208 adheres to various interface standards and protocols to ensure compatibility and interoperability with different types of devices. Common interface standards include USB, SATA, Ethernet, HDMI, Display Port, PCI Express, and SCSI.

Wireless connection 114 refers to the method by which the electronic device within the vehicle communicates with external devices, such as the user's computing device (e.g., smartphone, tablet) or other networked systems. The disclosure utilizes various wireless communication protocols to establish connections between the electronic device in the vehicle and external devices. Bluetooth technology enables short-range wireless communication between devices, typically within a range of approximately 10 meters (33 feet). Bluetooth is commonly used for connecting smartphones, tablets, and other mobile devices to in-car systems for hands-free calling, audio streaming, and data transfer. Wi-Fi technology allows for high-speed wireless data transfer over longer distances, typically within a range of several hundred feet. Wi-fi is commonly used for internet connectivity within vehicles, enabling access to online services, streaming media, and software updates. Zigbee is a low-power wireless communication protocol designed for short-range, low-data-rate applications. It is often used for home automation and sensor networks within vehicles, enabling connectivity between various electronic components and systems. Wireless connection 114 enables the electronic device within the vehicle to communicate with external devices without the need for physical cables or connections. This facilitates the transfer of data, such as files, commands, and settings, between the vehicle and external devices. Wireless connection 114 allows users to interact with the vehicle's information management system remotely using their own computing devices. For example, users can upload files, input commands, and access vehicle information using a smartphone or tablet connected via Bluetooth or Wi-Fi. The electronic device 102 within the vehicle is equipped with wireless communication capabilities and integrated with other vehicle systems, enabling seamless operation and data exchange. For example, it may communicate with the vehicle's infotainment system, navigation system, and onboard sensors to access and display information. Wireless connections 114 may employ encryption and authentication mechanisms to ensure the security and privacy of data transmitted between the vehicle and external devices. This helps prevent unauthorized access, data interception, and tampering.

The microphone 118 mentioned is likely a component of the electronic device installed within the vehicle. The microphone 118 could be used to capture voice inputs from the user for authentication purposes. For example, the user might speak a passphrase or answer security questions to verify their identity. In addition to or instead of traditional authentication methods like passwords or fingerprints, the system could use voice recognition as a form of biometric authentication. The microphone would capture the user's voice, which would then be analyzed and compared to pre-registered voiceprints to confirm identity. In a vehicle environment, where users might be focused on driving, voice commands could be used to interact with the system hands-free. For example, the user might verbally request certain files to be displayed or uploaded. In case of an emergency, such as an accident, the microphone could potentially be used to capture audio data within the vehicle, which could include conversations or sounds that might be relevant for post-incident analysis or emergency response.

In an exemplary operation, a method for providing information is disclosed. In an embodiment, an electronic device is configured to receive an input from a user to connect with the vehicle disposed in a vehicle. In an embodiment, based on the input the user is authorized to access the vehicle. In an embodiment, the electronic device is configured to upload one or more files associated with the user and the vehicle. In an embodiment, the electronic device is configured to store the one or more files in a memory of the vehicle. In an embodiment, one or more files are stored in an encrypted form and the one or more files being stored in the encrypted form are provided to one or more authorized entities based on input of a decryption key by the user. In an embodiment, the decryption key is configured to decrypt the one or more files. In an embodiment the one or more files are indexed so that they are properly placed in a database. In an embodiment, the electronic device corresponds to at least one of an instrument cluster, a secondary display screen, a heads-up display. In an embodiment, the electronic device being disposed within the user's view. In an embodiment, the one or more files being provided for uploading via a user computing device of the user. In an embodiment, the user computing device being communicatively coupled with the vehicle using a wired or wireless connection. In an embodiment, the wireless connection corresponds to at least one of Bluetooth, Wi-Fi, or ZigBee. In an embodiment, the one or more files may be transmitted to the user computing device of the user. In an embodiment, the one or more files being stored in the user computing device. In an embodiment for providing information the user computing device may be configured to download the one or more files to an external storage media. In an embodiment, the external storage media comprises at least one of a flash drive, a SD card, an optical drive, or a hard drive. In an embodiment, providing the one or more files comprises displaying the one or more files on a display screen of the vehicle. In an embodiment, the one or more files being stored in the memory of the vehicle or the user computing device of the user for a pre-defined time interval. In an embodiment, the time interval is indicative of a time for which the user has rented the vehicle. In an embodiment, the method comprises deleting the one or more files being stored in the memory of the vehicle after expiry of the pre-defined time interval. In an embodiment, the one or more files comprises a driver registration, a driver's license, insurance information of the vehicle, vehicle renter contracts, medical information, emergency contact information, vehicle purchase information, vehicle recall information vehicle service records, audio and video instruction or informational files and any other personal information of the user. In an embodiment, if the vehicle is stolen then the one or more files being unavailable to unauthorized parties as the one or more files being stored in the encrypted form. In an embodiment, user computing device is configured to transmit the one or more files to one or more authorized entities in case of an emergency associated with the vehicle. In an embodiment, the emergency corresponds to an accident. In an embodiment, if the vehicle is a rented vehicle, then vehicle related information being uploaded by an authorized user of a rental company of the vehicle. In an embodiment, for providing information about the vehicle, an electronic device is configured to label each of the one or more files based on one or more inputs from the user. In an embodiment, the input corresponds to at least one of a password, a voice input, a biometric input, a fingerprint, or a facial image. In an embodiment, the input being captured using one or more sensors. In an embodiment, the sensors comprise a finger print sensor, an image sensor, and a microphone.

Figure 3:
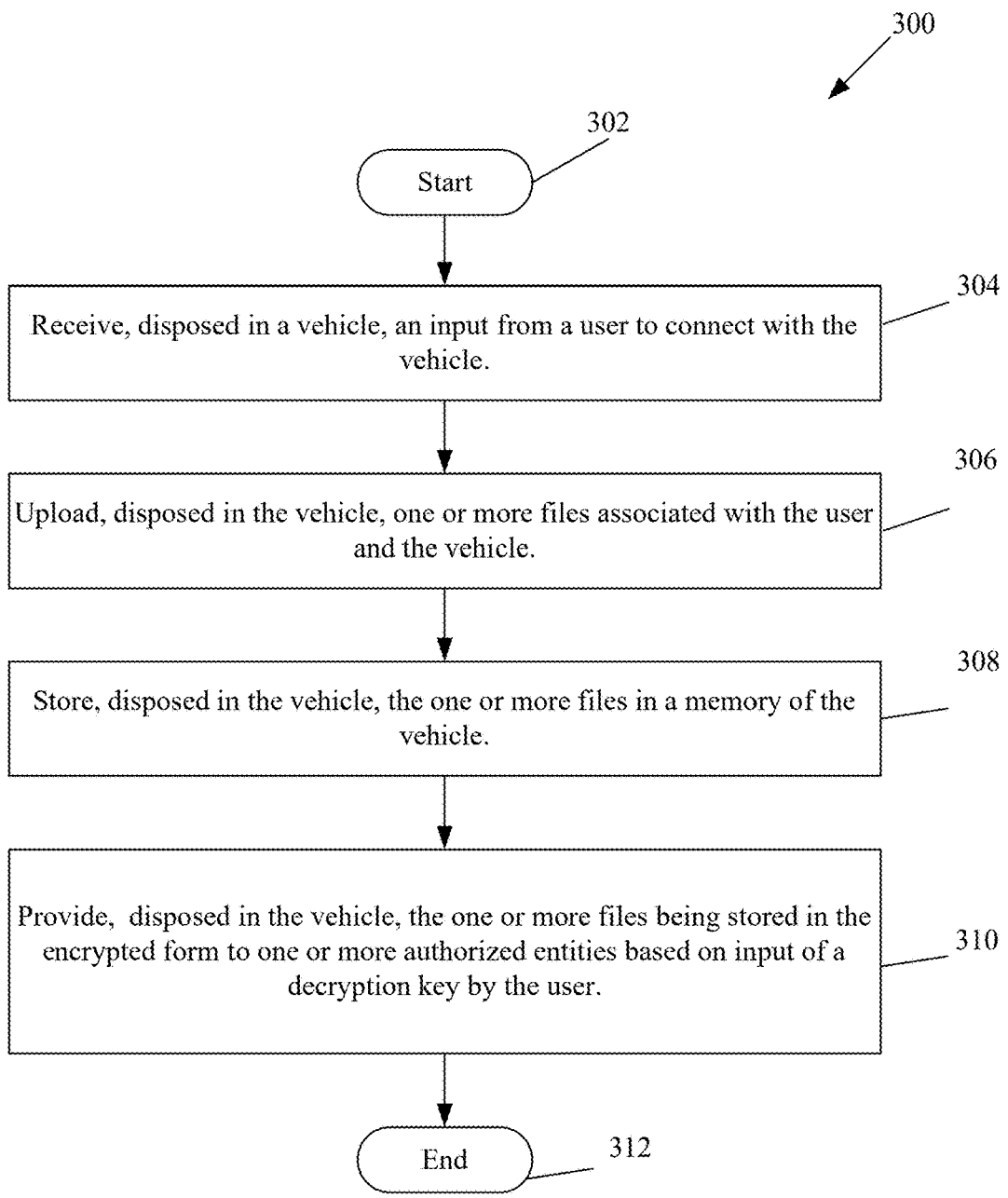
FIG. 3 is a flowchart that illustrates a method for providing information, in accordance with an embodiment of the present disclosure.

FIG. 3 is a flowchart that illustrates a method 300 for information execution by the processor, in accordance with an embodiment of the present disclosure. The method 300 may be performed by the electronic device 102. The method begins at Start step 302 and proceeds to step 304. At step 304, the processor of an electronic device 102 may be configured to receive an input from a user to connect with the vehicle. At step 306 the processor is configured to upload one or more files associated with the user and the vehicle. At step 308 the processor is configured to store the one or more files in a memory of the vehicle. At step 310 the processor is configured to provide the one or more files being stored in the encrypted form to one or more authorized entities based on input of a decryption key by the user. Control passes to end step 312.

Figure 4:
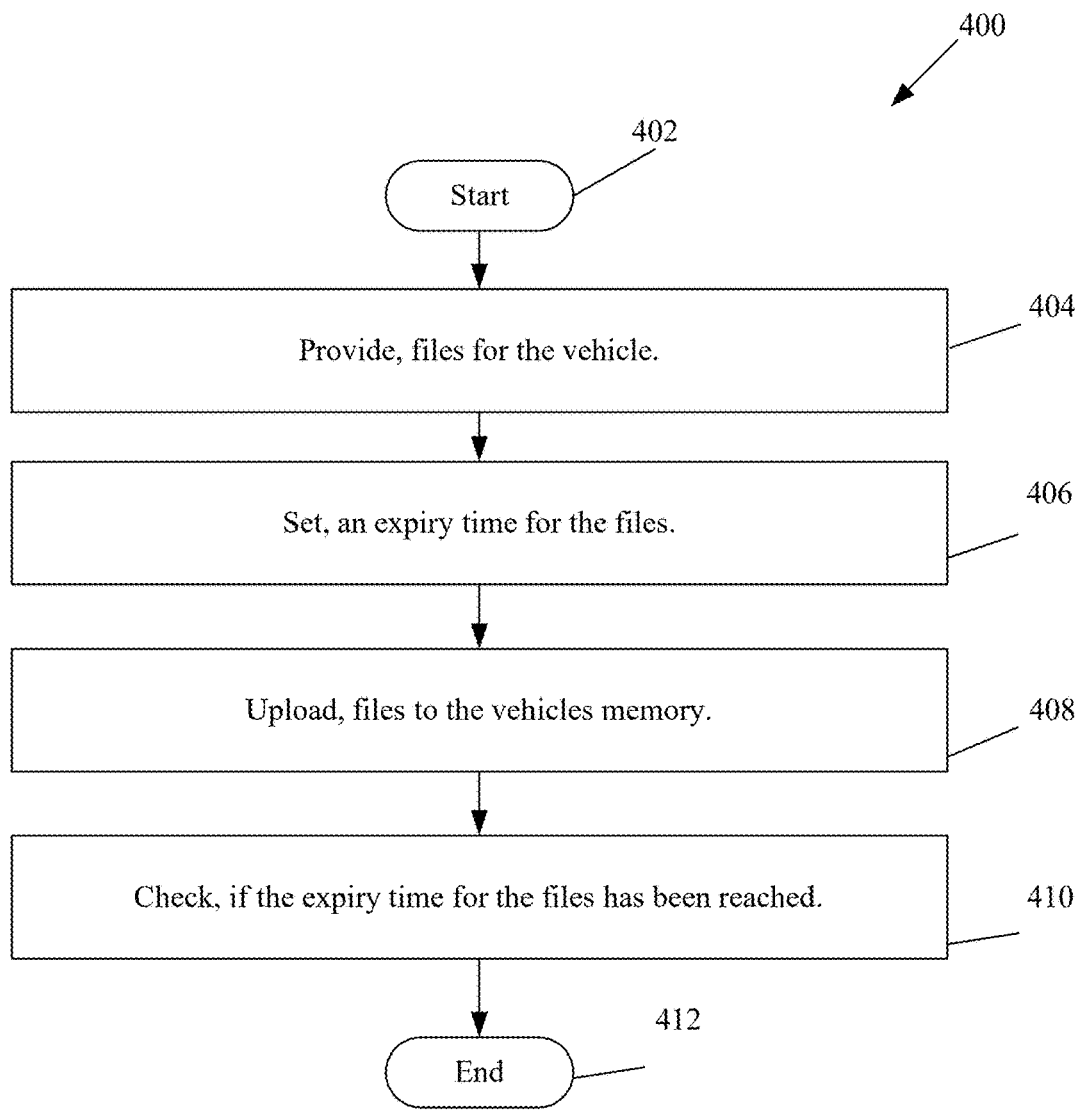
FIG. 4 is a flowchart that illustrates a method for time-based file management in a vehicle, in accordance with an embodiment of the present disclosure.

FIG. 4 is a flowchart that illustrates a method for time-based file management in a vehicle, in accordance with an embodiment of the present disclosure. The method 400 may be performed by the electronic device 102. The method begins at start step 402 and proceeds to 404. At step 404, the processor of an electronic device 102 may be configured to provide files for the vehicle. At step 406 the processor is configured to set an expiry time for the files. At step 408 the processor is configured to upload files to the vehicle's memory. At step 410 the processor is configured to check if the expiry time for the files has been reached. Control passes to end step 412.

Figure 5:
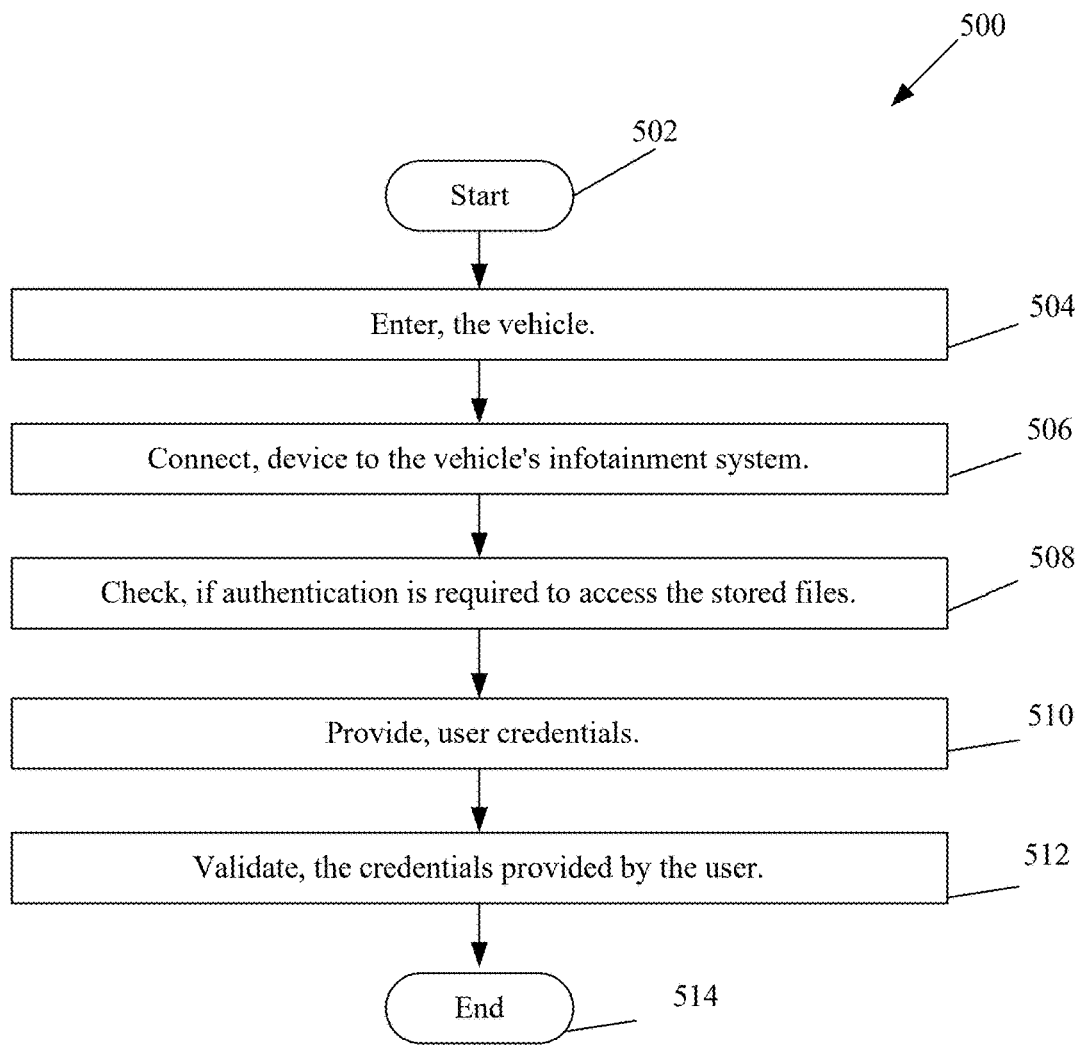
FIG. 5 is a flowchart that illustrates a method in the user's process of accessing the stored files within the vehicle's system after they have been uploaded, in accordance with an embodiment of the present disclosure.

FIG. 5 is a flowchart that illustrates a method in the user's process of accessing the stored files within the vehicle's system after they have been uploaded, in accordance with an embodiment of the present disclosure. The method 500 may be performed by the electronic device 102. The method begins at start step 502 and proceeds to 504. At step 504, the user enters the vehicle, At step 506, the user connects the device to the vehicle's infotainment system, At step 508, the user checks if authentication is required to access the stored files. At step 510, the user provides credentials. At step 512, the electronic device configured to processor to validate the credentials provided by the user. Control passes to end step 514.

In a working but non-limiting example of the aforementioned disclosure, the following is a detailed working example illustrating the functionality and operation of the present disclosure. A working example of the disclosure in the context of a rental vehicle scenario, John rents a car for a weekend getaway using a rental service that utilizes the disclosed technology for document management within their fleet. Before John enters the vehicle, the rental company preloads relevant files and instructional videos, into the vehicle's system based on his rental preferences. Upon picking up the rental car, John is instructed to connect his smartphone to the vehicle's infotainment system via Bluetooth. John pairs his smartphone with the vehicle's infotainment system and inputs his unique rental ID and a password provided by the rental service to authorize access to the vehicle's information management system. Once authorized, the electronic device within the vehicle uploads relevant files associated with John's rental agreement, including his driver's license, insurance information, and the rental contract. These files are encrypted and stored securely in the vehicle's memory. To access the stored files, John inputs his rental ID and password on the vehicle's touchscreen display, serving as the decryption key. This action decrypts the files and makes them accessible for viewing within the vehicle's interface. John can now view his driver's license, insurance details, and rental agreement directly on the vehicle's display screen. Additionally, he has the option to download these files to his smartphone for offline access during the rental period. The rental agreement specifies that files will be stored in the vehicle's memory for the duration of the rental period. After John returns the car and the rental period expires, the files are automatically deleted from the vehicle's memory to ensure compliance with data privacy regulations. In the event of an accident during the rental period, emergency responders can access John's medical information and insurance details stored within the vehicle's system by using a designated emergency access code provided by the rental service. In this example, the disclosure enables secure and convenient management of files within the rental vehicle, enhancing both user experience and safety during the rental period.

In one scenario John has asked for a car seat for his child and on that basis the Rental Company has uploaded a video on how to properly utilize the car. Upon John's request for a car seat for his child, the rental company recognizes the importance of ensuring his child's safety during the journey. To assist John in properly installing and using the car seat, the rental company takes advantage of the document management system integrated into their vehicles. The rental company uploads a comprehensive instructional video on how to properly install and utilize the car seat. This video covers topics such as securely fastening the seat in the vehicle, adjusting the harness for proper fit, and ensuring correct positioning for maximum safety. The video emphasizes important safety guidelines recommended by child safety organizations and regulatory authorities. Once uploaded, the instructional video is encrypted and securely stored in the vehicle's memory, along with other relevant files associated with John's rental agreement. This ensures that the video remains accessible only to authorized users, maintaining privacy and security. When John connects his smartphone to the vehicle's infotainment system and inputs his rental ID and password, he gains access to the instructional video. Using the touchscreen display, he can navigate to the section containing the car seat video. John watches the instructional video, which provides clear, step-by-step guidance on how to properly install and use the car seat. The video may include visual demonstrations, voice instructions, and text overlays to ensure clarity and understanding. Recognizing that John may need to refer to the instructions while on the road, he has the option to download the video to his smartphone for offline access during the rental period. This allows him to review the instructions even when outside of cellular or Wi-Fi coverage areas. By providing John with access to the instructional video, the rental company ensures that he is equipped with the knowledge and skills needed to safely transport his child. This proactive approach enhances John's confidence in the rental service and demonstrates a commitment to customer safety and satisfaction. In this scenario, the rental company's utilization of the document management system not only meets John's specific request for a car seat but also goes above and beyond by providing valuable educational resources to promote child safety during the rental period.

In another scenario upon John's request for access to satellite radio, the rental company endeavors to enhance his driving experience by guiding utilizing this feature effectively. Understanding John's interest in satellite radio, the rental company uploads a tutorial video demonstrating how to use the satellite radio system installed in the vehicle. The video covers topics such as selecting channels, saving presets, adjusting settings, and accessing additional features offered by the satellite radio service provider. Similar to other files and instructional videos, the satellite radio tutorial video is encrypted and securely stored in the vehicle's memory. This ensures that only authorized users, such as John, can access the video through the vehicle's interface. After John connects his smartphone to the vehicle's infotainment system and provides his rental ID and password, he gains access to the instructional video library. By using the touchscreen display or voice commands, he navigates to the section containing the satellite radio tutorial. John watches the tutorial video, which provides clear explanations and visual demonstrations of how to navigate the satellite radio interface. The video may highlight key features, offer tips for optimizing reception, and showcase popular channels or genres available through the satellite radio service. The satellite radio system recognizes that John may want to reference the instructions while driving, he has the option to download the video to his smartphone for offline viewing during the rental period. This ensures that he can familiarize himself with the satellite radio system even when not connected to the vehicle's infotainment system. By providing John with access to the satellite radio tutorial video, the rental company enables him to make the most of this feature during his rental period. Whether he's exploring new music channels, staying informed with news programs, or enjoying entertaining talk shows, John can enjoy a personalized and immersive driving experience. In this scenario, the rental company's proactive approach to customer satisfaction enhances John's overall rental experience by empowering him with the knowledge and skills needed to enjoy the satellite radio feature to its fullest potential.

A detailed working example of the disclosure, focusing on a specific scenario involving a user renting a vehicle and utilizing the disclosure's features, let us consider a scenario where John rents a car for a weekend trip using a rental service equipped with the disclosure's technology. John approaches the rental vehicle and activates the vehicle's onboard system by pressing a button on the dashboard. The vehicle's electronic device prompts John to input his rental ID and a password provided by the rental service for authorization. John enters his rental ID "RNT123" and password "Pass123" using the touchscreen display in the vehicle. Upon successful authorization, the vehicle's electronic device uploads relevant files associated with John's rental agreement. Files include John's driver's license, insurance information, and the rental contract. Each document is encrypted using AES-256 encryption before being stored in the vehicle's memory. To access the stored files, John enters his rental ID "RNT123" and password "Pass123" again on the touchscreen display, serving as the decryption key. John's biometric data (fingerprint) is also captured by the vehicle's fingerprint sensor for additional authentication. Once decrypted biometric data, John can view his driver's license details, insurance policy information, and the rental agreement on the vehicle's display screen. John chooses to download a digital copy of these files to his smartphone via Bluetooth for offline access during the rental period. The rental agreement specifies that files will be stored in the vehicle's memory for the duration of the rental period, which is two days. A countdown timer is initiated upon rental initiation, and files are set to be automatically deleted from the vehicle's memory after 48 hours. In the event of an accident during the rental period, emergency responders can access John's medical information stored within the vehicle's system by entering a designated emergency access code provided by the rental service. The code "EMERG123" grants access to John's medical records, including blood type, allergies, and emergency contact information. In this detailed example, the disclosure's technology facilitates secure document management within the rental vehicle, providing John with convenient access to essential information while ensuring data security and compliance with rental agreements.

Various embodiments of the disclosure encompass numerous advantages. The disclosure offers several technical advantages over conventional methods. The method for providing information enhanced security by storing files in encrypted form within the vehicle's memory, the disclosure significantly reduces the risk of unauthorized access or data breaches. This encryption ensures that sensitive information remains protected even if the vehicle is stolen or compromised. In an embodiment, authorized users can quickly access their stored files within the vehicle environment by inputting a decryption key, eliminating the need for physical files or external storage devices. This streamlines the process and enhances user convenience, especially in emergency situations. The disclosure leverages existing electronic devices within the vehicle, such as instrument clusters or display screens, for document storage and access. This integration ensures seamless functionality and eliminates the need for additional hardware or complex installations. Users can authenticate themselves using various methods such as passwords, voice commands, or biometric data, providing flexibility and accommodating different user preferences and accessibility needs. The disclosure supports time-limited storage of files, automatically deleting them from the vehicle's memory after a predefined interval. This ensures compliance with rental agreements or temporary access requirements while optimizing storage space. In emergency situations such as accidents, authorized entities can quickly access critical information stored within the vehicle, facilitating prompt assistance and response. This can potentially save lives and minimize the impact of emergencies. The disclosure can be tailored to meet the specific needs of different vehicle models, users, or applications. Additionally, it is designed to scale with evolving technological advancements and user requirements, ensuring long-term usability and adaptability. The method for providing information reduced risk of document loss or damage by providing a digital alternative for storing and accessing files, the disclosure minimizes the risk of losing or damaging physical files. This enhances data integrity and reliability, particularly in harsh or unpredictable environments. The technical advantages of the disclosure contribute to improved security, accessibility, and efficiency in managing vehicle-related information, offering a comprehensive solution for both users and vehicle operators.

The disclosure is not abstract because it solves a specific technical problem within a practical and tangible domain, namely the management of information within a vehicle environment. It offers a concrete solution that involves the use of electronic devices, encryption techniques, user authentication methods, and integration with vehicle systems to securely store and access files related to the vehicle and its users. Furthermore, the disclosure combines various technical elements in a novel and non-obvious manner to achieve its objectives. The disclosure integrates multiple technologies, including electronic devices within vehicles, encryption techniques, user authentication methods, and dynamic document management. While these technologies are individually known, their integration in the context of managing vehicle-related information in the manner described by the disclosure may not be obvious to someone skilled in the art. The disclosure offers flexible authentication methods such as passwords, voice commands, and biometric data. The selection and customization of these authentication methods to suit the vehicle environment and user preferences may involve innovative design considerations beyond what is typically known in the field. The concept of time-limited storage for files, automatically deleting them after a predefined interval, introduces a dynamic element to information management within vehicles. This feature may not be an obvious solution to managing document storage efficiently while complying with rental agreements or temporary access requirements. The disclosure facilitates quick access to critical information stored within the vehicle in emergency situations such as accidents. Integrating this functionality seamlessly into the vehicle environment while maintaining security and privacy may require inventive steps beyond what is conventionally practiced. The present disclosure offers a practical and innovative solution to the technical challenges associated with managing information within vehicles, incorporating novel features and integrations that would not be obvious to a person skilled in the art.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like. The claims can encompass embodiments for hardware and software, or a combination thereof.

While the present disclosure has been described with reference to certain embodiments, it will be understood by those skilled in the art that various changes may be made, and equivalents may be substituted without departing from the scope of the present disclosure. In addition, many modifications may be made to adapt a particular situation or material to the teachings of the present disclosure without departing from its scope. Therefore, it is intended that the present disclosure is no limited to the particular embodiment disclosed, but that the present disclosure will include all embodiments falling within the scope of the appended claims.

What is claimed is:

1. A method for providing information, the method comprising:

receiving, by an electronic device disposed in a vehicle, an input from a user to connect with the vehicle, wherein based on the input the user is authorized to access the vehicle;

obtaining, by the electronic device disposed in the vehicle, at least one files associated with the user and the vehicle based on the input;

setting, by the electronic device disposed in the vehicle, an expiry time for the at least one files associated with the user and the vehicle, wherein the expiry time is indicative of a predefined time interval for which the user desires to store the at least at least one files associated with the user and the vehicle;

uploading, by the electronic device disposed in the vehicle, the at least one files associated with the user and the vehicle with the expiry time;

storing, by the electronic device disposed in the vehicle, the at least one files in a memory of the vehicle, wherein at least one files being stored in an encrypted form;

providing, by the electronic device disposed in the vehicle, the at least one files being stored in the encrypted form to at least one authorized entities based on input of a decryption key by the user, wherein the decryption key is configured to decrypt the at least one files; and deleting, by the electronic device disposed in the vehicle, the at least one files being stored in the memory of the vehicle after completion of the expiry time.

2. The method for providing information as claimed in claim 1, wherein the electronic device is at least one device selected from the set of electronic devices consisting of: of an instrument cluster, a secondary display screen, a heads-up display wherein the electronic device is disposed within the user's view.

3. The method for providing information as claimed in claim 1, wherein the at least one files is provided for uploading via a user computing device of the user, wherein the user computing device being communicatively coupled with the vehicle using a wired or wireless connection.

4. The method for providing information as claimed in claim 1, further comprising labelling each of the at least one files based on at least one inputs from the user.

5. The method for providing information as claimed in claim 1, wherein the input corresponds to at least one input selected from the set of inputs consisting of: a password, a voice input, a biometric input, a fingerprint, and a facial recognition, wherein the input being captured using at least one sensors, wherein the sensors is selected from the set of sensors consisting of: a finger print sensor, an image sensor, and a microphone.

6. The method for providing information as claimed in claim 1, further comprising transmitting the at least one files to the user computing device of the user, wherein the at least one files being stored in the user computing device.

7. The method for providing information as claimed in claim 1, comprises downloading the at least one files to an external storage media, wherein the external storage media is at least one storage media selected from the set of storage media consisting of: of a flash drive, a SD card, and a hard drive.

8. The method for providing information as claimed in claim 1, wherein providing the at least one files comprises displaying the at least one files on a display screen of the vehicle.

9. The method for providing information as claimed in claim 1, wherein the at least one files is selected from the set of files consisting of: a driver registration, a driver's license, insurance information of the vehicle, vehicle renter contracts, medical information, emergency contact information, vehicle purchase information, vehicle service records, vehicle recall information, audio and video instruction or informational files, and any other personal information of the user.

10. The method for providing information as claimed in claim 1, wherein if the vehicle is stolen then the at least one files are unavailable to unauthorized parties as the at least one files being stored in the encrypted form.

11. The method for providing information as claimed in claim 1, further comprising a step of transmitting the at least one files to at least one authorized entities in case of an emergency associated with the vehicle, wherein the emergency corresponds to an accident.

12. The method for providing information as claimed in claim 1, wherein if the vehicle is a rented vehicle, then vehicle related information being uploaded by an authorized user of a rental company of the vehicle.

13. A system for providing information, the system comprising:
   a processor; and
   a memory storing instructions for execution by the processor, wherein the hardware processor is configured by the instructions to:
      receive, by an electronic device disposed in a vehicle, an input from a user to connect with the vehicle, wherein based on the input the user is authorized to access the vehicle;
      obtain, by the electronic device disposed in the vehicle, at least one files associated with the user and the vehicle based on the input;
      set, by the electronic device disposed in the vehicle, an expiry time for the at least one files associated with the user and the vehicle, wherein the expiry time is indicative of a predefined time interval for which the user desires to store the at least at least one files associated with the user and the vehicle;
      upload, by the electronic device disposed in the vehicle, at least one files associated with the user and the vehicle;
      store, by the electronic device disposed in the vehicle, the at least one files in a memory of the vehicle, wherein at least one files being stored in an encrypted form;
      provide, by the electronic device disposed in the vehicle, the at least one files being stored in the encrypted form to at least one authorized entities based on input of a decryption key by the user, wherein the decryption key is configured to decrypt the at least one files; and
      delete, by the electronic device disposed in the vehicle, the at least one files being stored in the memory of the vehicle after completion of the expiry time.

14. The system of providing information as claimed in claim 13, wherein the electronic device is at least one device selected from the set of electronic devices consisting of: of an instrument cluster, a secondary display screen, and a heads-up display, wherein the electronic device is disposed within the user's view.

15. The system of providing information as claimed in claim 13, wherein the at least one files is provided for uploading via a user computing device of the user, wherein the user computing device being communicatively coupled with the vehicle using a wired or wireless connection.

16. The system of providing information as claimed in claim 13, further comprising labelling each of the at least one files based on at least one inputs from the user.

17. The system of providing information as claimed in claim 13, wherein the input is at least one input selected form the set of inputs consisting of: a password, a voice input, a biometric input, a fingerprint, and a facial recognition, wherein the input being captured using at least one sensors being selected from the set of sensors consisting of: a finger print sensor, an image sensor, and a microphone.

18. The system of providing information as claimed in claim 13, further comprising the step of transmitting the at least one files to the user computing device of the user, wherein the at least one files being stored in the user computing device.

19. A method for providing information, the method comprising:
   receiving, by an electronic device disposed in a vehicle, an input from a user to connect with the vehicle, wherein based on the input the user is authorized to access the vehicle;
   obtaining, by the electronic device disposed in the vehicle, at least one files associated with the user and the vehicle based on the input;
   obtaining, by the electronic device disposed in the vehicle, details related to a rental service of the vehicle;
   setting, by the electronic device disposed in the vehicle, an expiry time for the at least one files associated with the user and the vehicle based on the details related to a rental service of the vehicle, wherein the expiry time is indicative of a time for which the user has rented the vehicle;
   uploading, by the electronic device disposed in the vehicle, at least one files associated with the user and the vehicle;
   storing, by the electronic device disposed in the vehicle, the at least one files in a memory of the vehicle, wherein at least one files being stored in an encrypted form, wherein the at least one files being stored in the memory of the vehicle or the user computing device of the user for a pre-defined time interval based on the expiry time, wherein the time interval is indicative of a time for which the user has rented the vehicle; and
   providing, by the electronic device disposed in the vehicle, the at least one files being stored in the encrypted form to at least one authorized entities based on input of a decryption key by the user, wherein the decryption key is configured to decrypt the at least one files.

20. The method for providing information as claimed in claim 19, further comprising the step of deleting the at least one files being stored in the memory of the vehicle after expiry of the pre-defined time interval.

* * * * *